(12) United States Patent
Nakanishi (10) Patent No.: US 10,935,488 B2
(45) Date of Patent: Mar. 2, 2021

(54) OPTICAL COMPONENT FOR TERAHERTZ WAVES

(71) Applicant: HAMAMATSU PHOTONICS K.K., Hamamatsu (JP)

(72) Inventor: Atsushi Nakanishi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 7 days.

(21) Appl. No.: 16/419,307

(22) Filed: May 22, 2019

(65) Prior Publication Data

US 2019/0360926 A1    Nov. 28, 2019

(30) Foreign Application Priority Data

May 24, 2018  (JP) .............................. JP2018-099746

(51) Int. Cl.
*G01N 21/3581*    (2014.01)
*G01J 3/42*    (2006.01)

(52) U.S. Cl.
CPC ............ *G01N 21/3581* (2013.01); *G01J 3/42* (2013.01)

(58) Field of Classification Search
CPC ....... G01N 21/3581; G01N 2021/3572; G01N 21/3563; G01N 21/3554; G01J 3/42; G01J 3/0208; G01J 3/0213; G02B 1/04; G02B 1/041; G02B 1/00
See application file for complete search history.

(56) References Cited

FOREIGN PATENT DOCUMENTS

JP    2014-81448 A    5/2014

OTHER PUBLICATIONS

Argyros ("Microstructures in Polymer Fibres for Optical Fibres, THz Waveguides, and Fibre-Based Metamaterials", Hindawi Publishing Corporation ISRN Optics vol. 2013, Article ID 785162, 22 pages) (Year: 2013).*

* cited by examiner

*Primary Examiner* — David P Porta
*Assistant Examiner* — Meenakshi S Sahu
(74) *Attorney, Agent, or Firm* — Faegre Drinker Biddle & Reath LLP

(57) ABSTRACT

An optical component for terahertz waves includes a resin member that includes a powder containing cellulose. A content ratio of the powder in the resin member is 60 wt % or less.

7 Claims, 9 Drawing Sheets

OPTICAL COMPONENT FOR TERAHERTZ WAVES

TECHNICAL FIELD

The present invention relates to an optical component for terahertz waves.

BACKGROUND

Known Optical materials transmits terahertz waves. For example, Japanese Unexamined Patent Publication No. 2014-81448 describes an optical component for terahertz waves that is made of alumina.

SUMMARY

The optical component for terahertz waves may be made of for example alumina or silicon. However, there is still room for consideration in selecting materials for optical components for terahertz waves, and expansion of options for selection is desired.

An object of one aspect of the present invention is to provide an optical component for terahertz waves capable of securing desired optical characteristics for terahertz waves.

An optical component for terahertz waves according to one aspect of the present invention includes a resin member that includes a powder containing cellulose, wherein a content ratio of the powder in the resin member is 60 wt % or less.

In the aspect, the optical components includes the resin member that includes the powder containing cellulose. Since the content ratio of the powder in the resin member is 60 wt % or less, an optical component having desired optical characteristics with respect to the terahertz waves can be easily molded. The desired optical characteristics are, for example, a desired refractive index and an desired absorption coefficient for terahertz waves.

In the aspect, a content ratio of the powder in the resin member may be 50 wt % or less. In this case, water tends not to penetrate from the outside, and the optical characteristics with respect to the terahertz waves tends not to change.

In the aspect, a content ratio of the powder in the resin member may be 40 wt % or less. In this case, water further tends not to penetrate from the outside, and the optical characteristics with respect to the terahertz waves further tends not to change.

In the aspect, a content ratio of the powder in the resin member may be 5 wt % or more. A configuration in which the content ratio of the powder in the resin member is 5 wt % or more secures the desired optical characteristics with respect to the terahertz waves.

In the aspect, a total content ratio of the powder and a synthetic resin in the optical component may be larger than 97 wt %. A configuration in which the total content ratio of the powder and the synthetic resin in the optical component is larger than 97 wt % secures the desired optical characteristics with respect to the terahertz waves.

In the aspect, a content ratio of the powder per unit volume may vary according to position in the optical component. A configuration in which the content ratio of the powder per unit volume varies at positions in the optical component realizes the optical component having different optical characteristics with respect to the terahertz waves at the positions therein. Therefore, this configuration increases variations in a shape and a use of the optical component, as compared with a configuration in which the powder is homogeneously distributed throughout the optical component. For example, a lens for terahertz waves having a flat plate shape, an optical fiber for terahertz waves, and the like can be realized.

In the aspect, the content ratio of the powder may decrease or increase toward an end of the optical component when seen in a direction facing an entrance surface of the optical component for terahertz waves. A configuration in which the content ratio of the powder decreases or increases toward the end of the optical component when seen in the direction improves variations in the shape and the use of the optical component, as compared with the configuration in which the powder is homogeneously distributed throughout the optical component. For example, a lens for terahertz waves having a flat plate shape can be realized.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION

Hereinafter, embodiments of the present invention will be described in detail with reference to the accompanying drawings. In the description, the same reference numerals are used for the same elements or elements having the same function, and redundant explanations will be omitted.

Figure 1:
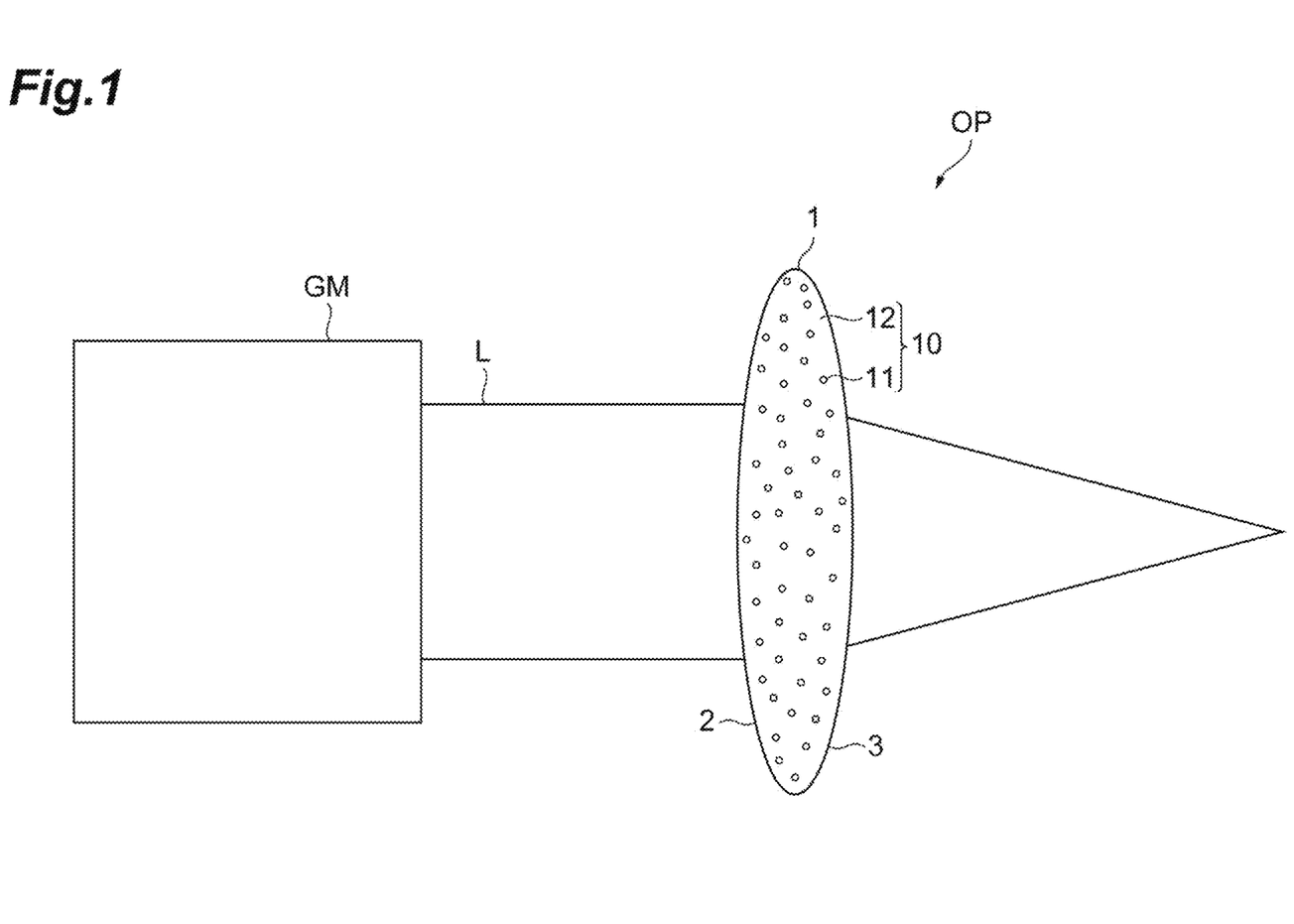
FIG. 1 is a view illustrating an optical device according to an embodiment.

First, a configuration of an optical device according to the embodiment will be described with reference to FIG. 1. FIG. 1 illustrates the optical device according to the embodiment.

The optical device OP includes a terahertz wave generation module GM, and an optical component 1. The generation module GM generates terahertz wave L. The terahertz wave L output from the generation module GM are incident on the optical component 1. The terahertz wave L is electromagnetic wave in a frequency band of about 0.01 THz to about 10 THz. The generation module GM includes, for example, a quantum cascade laser. The generation module GM may include, for example, a light source that emits pump light, and a photoconductive antenna that generates terahertz waves upon incidence of the pump light, instead of the quantum cascade laser. The generation module GM is not limited to these modes and may be a module that generates the terahertz wave L.

The optical component 1 is an optical component for terahertz waves that transmits the terahertz wave L. An entrance surface 2 and an exit surface 3 of the optical component 1 are formed in a convex shape. The optical component 1 serves as a convex lens for terahertz waves. In the embodiment, the optical component 1 has a positive refractive power with respect to the terahertz wave L. As illustrated in FIG. 1, the terahertz wave L incident on the entrance surface 2 of the optical component 1 is emitted from the exit surface 3 and condensed.

The optical component 1 includes a resin member 10. The resin member 10 has a desired refractive index and desired absorption coefficient with respect to the terahertz wave L. The desired refractive index and desired absorption coefficient are set, for example, according to the use. The resin member 10 includes a powder 11 containing cellulose and a synthetic resin 12. In the embodiment, a content ratio of the powder 11 in the resin member 10 is 60 wt % or less and 5 wt % or more. A particle size of the powder 11 is 10 nm to 1 mm. The powder 11 includes, for example, wood flour made of wood. The wood includes, for example, bamboo. The synthetic resin 12 includes, for example, a synthetic resin having thermoplasticity. Synthetic resins having thermoplasticity include, for example, polyolefins. Polyolefins include, for example, polyethylene or polypropylene. Polypropylene includes, for example, a homopolymeric homopolymer, a copolymeric random copolymer, or a block copolymer.

The total content ratio of the powder 11 and the synthetic resin 12 in the optical component 1 is larger than 97 wt %. In the embodiment, the optical component 1 does not include any additive other than the powder 11 and the synthetic resin 12. In the optical component 1, the powder 11 is homogeneously distributed throughout the optical component 1. The homogeneous distribution of the powder 11 means, for example, the following state. When the content ratio of the powder 11 per unit volume is measured at any of a plurality of positions of the optical component 1, each measured value is included within ±5% of an average value of the measured values. The terahertz wave L transmitted through the optical component 1 is uniformly distributed. "Homogeneous" and "uniform" include a margin of error. In this case, the margin of error depends on, for example, the use.

Figure 2:
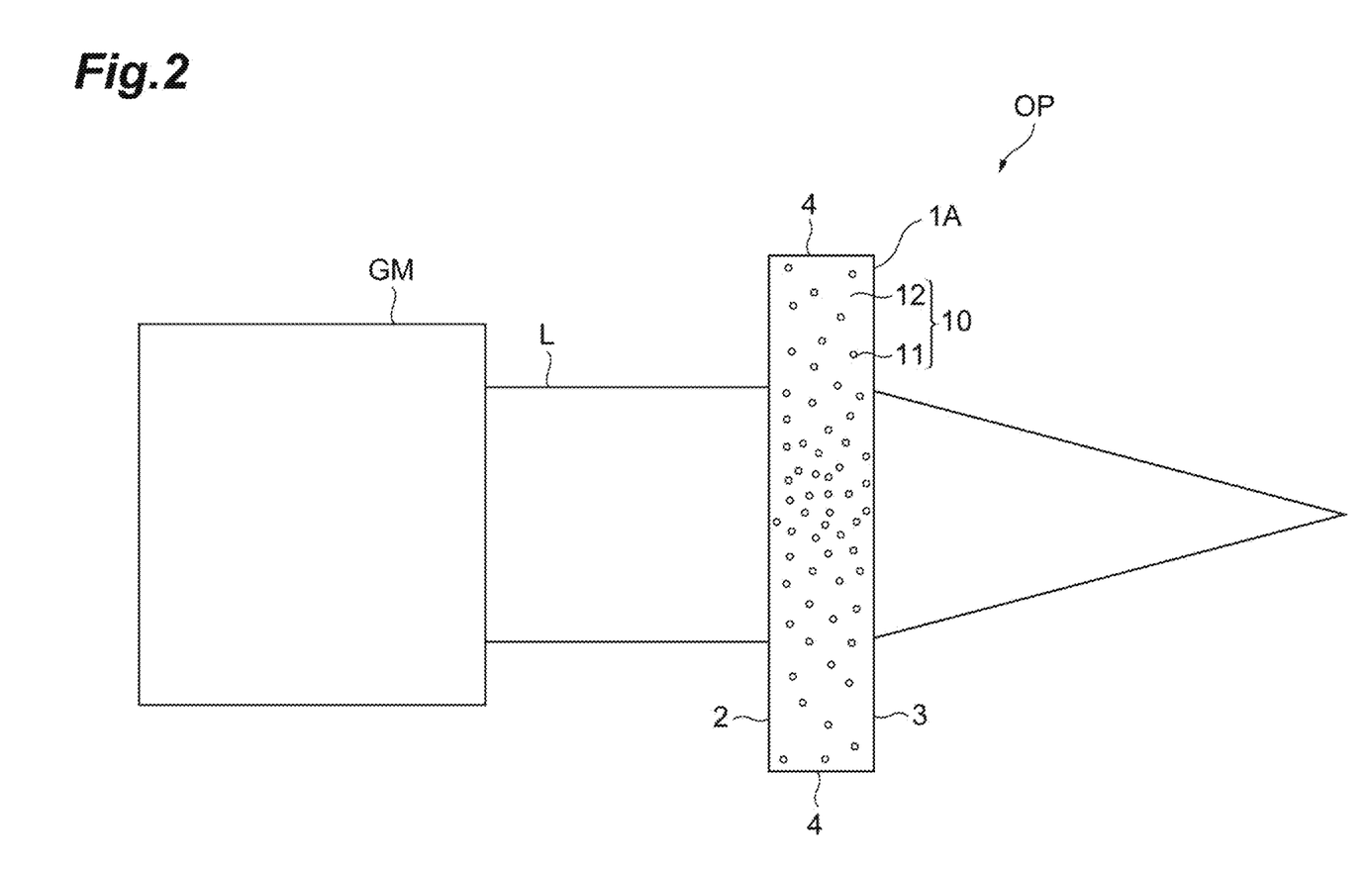
FIG. 2 is a view illustrating an optical device according to a modified example of the embodiment.

Next, an optical device according to a modified example of the embodiment will be described with reference to FIG. 2. The optical device OP illustrated in FIG. 2 includes the generation module GM and an optical component 1A. Like the optical component 1, the optical component 1A is an optical component for terahertz waves. The optical component 1A includes the resin member 10 and transmits the terahertz wave L. The total content ratio of the powder 11 and the synthetic resin 12 in the optical component 1A is larger than 97 wt %. In the embodiment, the optical component 1A does not include any additive other than the powder 11 and the synthetic resin 12.

In the optical component 1A, the content ratio of the powder 11 per unit volume varies according to position in the optical component 1A. The unit volume is, for example, 1 cubic millimeter. For example, in the optical component 1A, the content ratio of the powder 11 per unit volume varies according to position in the optical component 1A in a direction orthogonal to a direction in which the terahertz wave L is incident. Therefore, in the optical component 1A, a refractive index with respect to the terahertz wave L varies according to position in the optical component 1A in the direction orthogonal to the direction in which the terahertz wave L is incident. For example, the content ratio of powder 11 per unit volume varies according to position in the optical component 1A in a direction orthogonal to an optical axis of the optical component 1A.

The optical component 1A may have, for example, the following configuration. The content ratio of the powder 11 per unit volume varies according to position in the optical component 1A in a direction along the incidence direction of the terahertz wave L or a direction of the optical axis.

In the modified example, the optical component 1A has a flat plate shape, and an entrance surface 2 and an exit surface 3 of the optical component 1A are flat. The optical component 1A has the following configuration. In the direction orthogonal to the incidence direction of the terahertz wave L, the content ratio of the powder 11 per unit volume decreases toward an end 4 from a center portion of the optical component 1A. In other words, the content ratio of the powder 11 decreases toward the end 4 of the optical component 1A when seen in a direction facing the entrance surface 2 of the optical component 1A. Furthermore, in other words, in the optical component 1A, the content ratio of the powder 11 per unit volume decreases away from the optical axis of the optical component 1A. The incidence direction of the terahertz wave L means the optical axis of the optical component 1A.

In the optical component 1A, the refractive index with respect to the terahertz wave L decreases toward the end 4 of the optical component 1A in the direction orthogonal to the incidence direction of the terahertz wave L. As a result, the optical component 1A serves as a convex lens for terahertz waves. In the modified example, the optical component 1A has a positive refractive power with respect to the terahertz wave L. As illustrated in FIG. 2, the terahertz wave L incident on the entrance surface 2 of the optical component 1A is emitted from the exit surface 3 and condensed.

The optical component 1A may have, for example, the following configuration. In the direction along the incidence direction of the terahertz wave L or the direction of the optical axis, the content ratio of the powder 11 decreases toward the entrance surface 2 and the exit surface 3 from the center portion of the optical component 1A.

Figure 3:
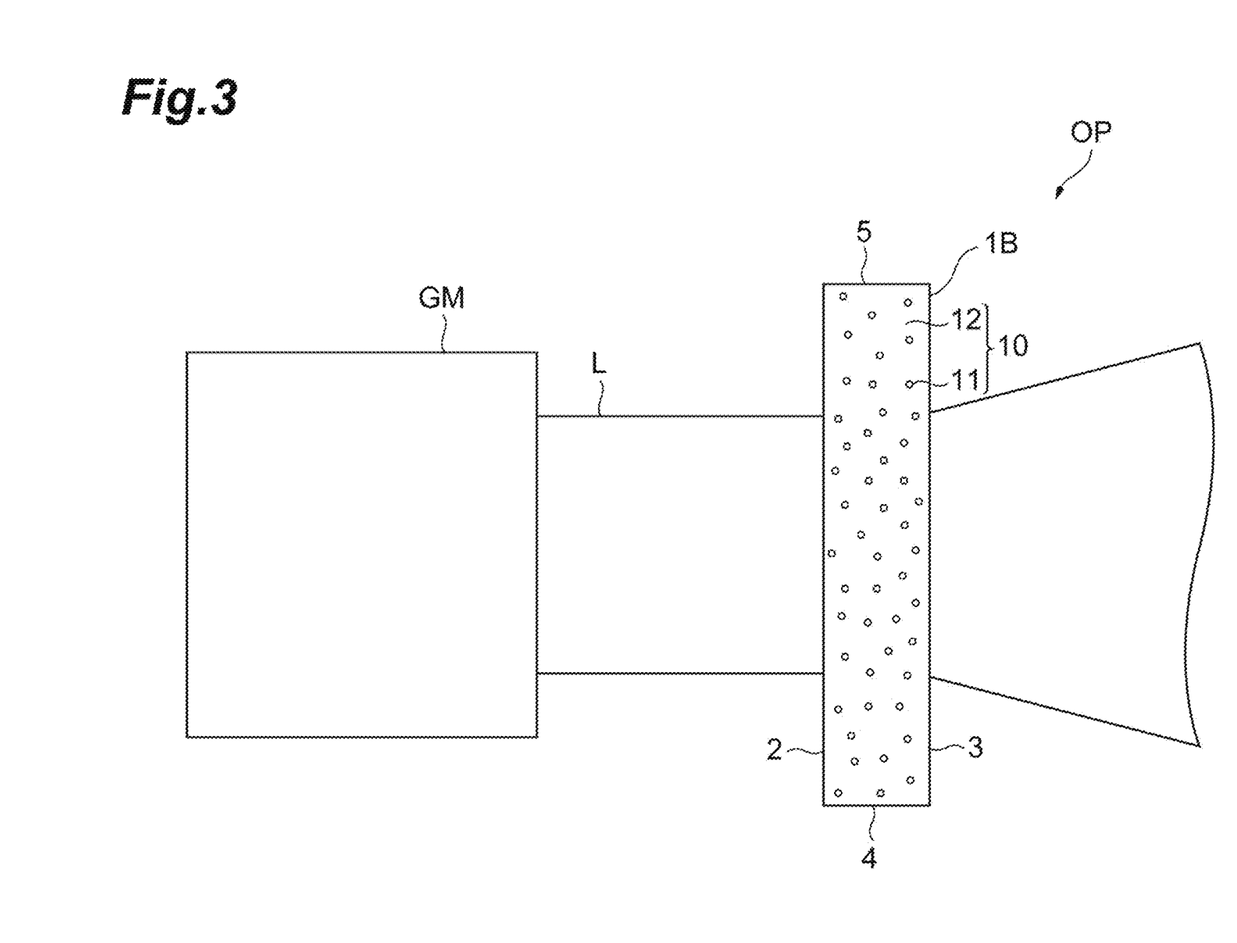
FIG. 3 is a view illustrating an optical device according to a modified example of the embodiment.

Next, with reference to FIG. 3, an optical device according to a modified example of the embodiment will be described. The optical device OP illustrated in FIG. 3 includes the generation module GM and an optical component 1B. Like the optical component 1, the optical component 1B is an optical component for terahertz waves. The optical component 1B includes the resin member 10 and transmits the terahertz wave L. The total content ratio of the powder 11 and the synthetic resin 12 in the optical component 1B is larger than 97 wt %.

In the embodiment, the optical component 1B does not include any additive other than the powder 11 and the synthetic resin 12. In the optical component 1B, the powder 11 is homogeneously distributed throughout the optical component 1B. The homogeneous distribution of the powder 11 means, for example, the following state. When the content ratio of the powder 11 per unit volume is measured at any of a plurality of positions of the optical component 1B, each measured value is included within +5% of an average value of the measured values. A terahertz wave transmitted through the optical component 1B is uniformly distributed.

The optical component 1B serves as a diffusion plate for terahertz waves. The optical component 1B is used, for example, to control light distribution with respect to the terahertz wave L or to smooth luminance distribution. In the modified example, the optical component 1B has a flat plate shape, and the entrance surface 2 and the exit surface 3 of the optical component 1B are formed to be flat. In the optical component 1B, the particle size of the powder 11 is 1 μm to 1 mm. In the optical component 1B, the incident terahertz wave L is scattered by the powder 11. As illustrated in FIG. 3, a diameter of the terahertz wave L emitted from the exit surface 3 is diffused. The terahertz wave L emitted from the exit surface 3 have a larger diameter away from the optical component 1B.

Figure 4:
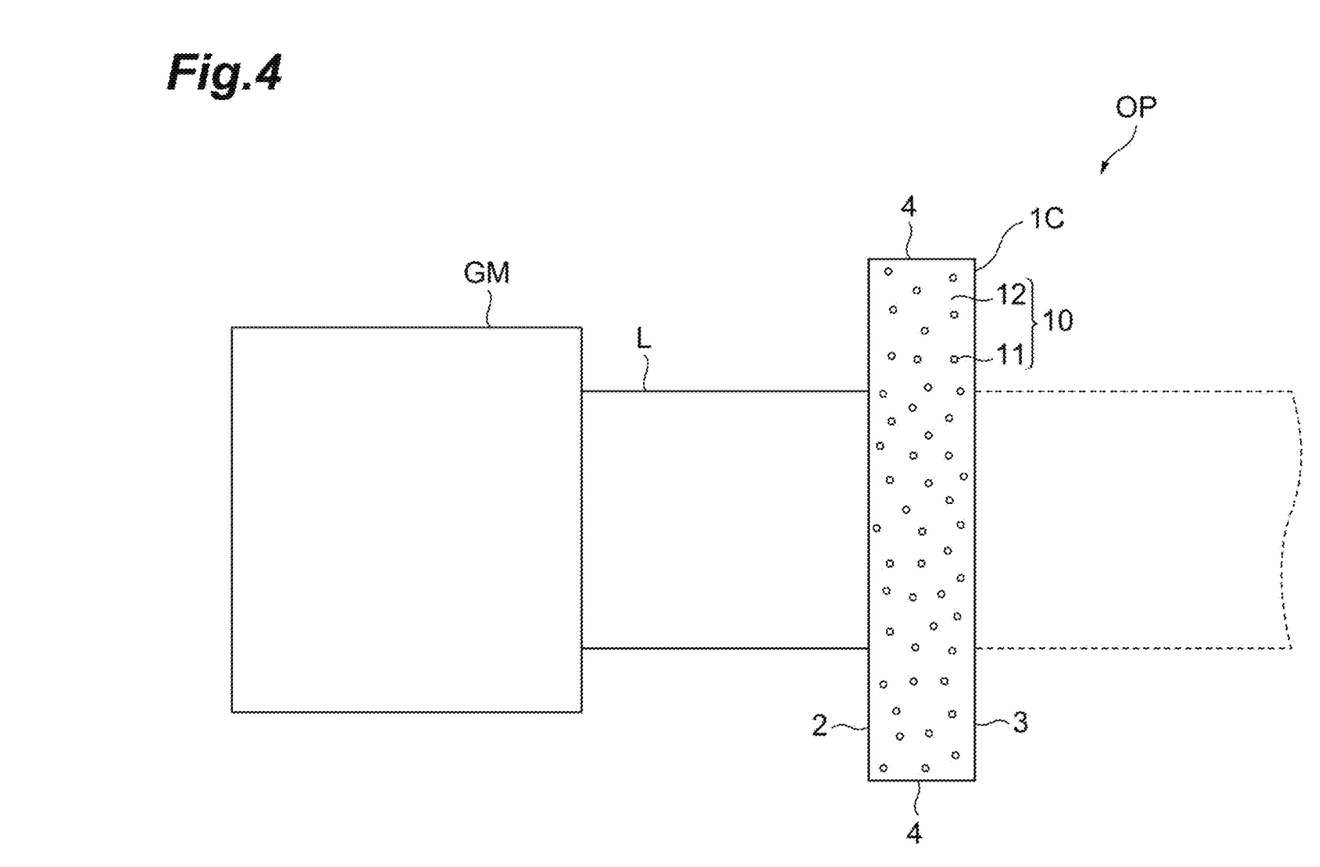
FIG. 4 is a view illustrating an optical device according to a modified example of the embodiment.

Next, an optical device according to a modified example of the embodiment will be described with reference to FIG. 4. The optical device OP illustrated in FIG. 4 includes the generation module GM and an optical component 1C. Like the optical component 1, the optical component 1C is an optical component for terahertz waves. The optical component 1C has the resin member 10 and transmits the terahertz wave L. The total content ratio of the powder 11 and the synthetic resin 12 in the optical component 1C is larger than 97 wt %. In the embodiment, the optical component 1C does not include any additive other than the powder 11 and the synthetic resin 12. In the optical component 1C, the powder 11 is homogeneously distributed throughout the optical component 1C.

The homogeneous distribution of the powder 11 means, for example, the following state. When the content ratio of the powder 11 per unit volume is measured at any of a plurality of positions of the optical component 1C, each measured value is included within ±5% of an average value of the measured values. The terahertz wave transmitted through the optical component 1C is uniformly distributed.

The optical component 1C serves as a light attenuation filter for terahertz waves. In the modified example, the optical component 1C has a flat plate shape, and the entrance surface 2 and the exit surface 3 of the optical component 1C are formed to be flat. In the optical component 1C, the incident terahertz wave L is attenuated due to absorption and scattering by the powder 11. The intensity of the terahertz wave L emitted from the exit surface 3 is reduced at a desired ratio with respect to the intensity of the terahertz wave L incident on the entrance surface 2. A rate of the terahertz wave reduced by the optical component 1C depends on the absorption coefficient of the resin member 10 with respect to the terahertz wave L and a length of an optical path of the incident terahertz wave L.

Next, physical properties of the resin member 10 will be described with reference to FIGS. 5 to 9. In order to evaluate the physical properties of the resin member 10, a plurality of flat plate-shaped samples S1, S2, S3, S4, S5, S6, S7, and S8 were prepared. The sample S1 is made of the synthetic resin 12. Each of the samples S2, S3, S4, S5, S6, S7, and S8 is made of the resin member 10. All the samples S2, S3, S4, S5, S6, S7, and S8 are made of the powder 11 and the synthetic resin 12. The synthetic resin 12 includes, for example, homopolymeric polypropylene. In the samples S2, S3, S4, S5, S6, S7, and S8, a median value of the particle size of the powder 11 is about 150 μm. In the samples S2, S3, S4, S5, S6, S7, and S8, the powder 11 is homogeneously distributed in the whole of the samples S2, S3, S4, S5, S6, S7, and S8.

The samples S2, S3, S4, 85, S6, S7, and S8 have different content ratios of the powder 11. In the samples S1, S2, S3, S4, S5, S6, S7, and S8, the content ratio of the powder 11 is 0 wt %, 5 wt %, 10 wt %, 20 wt %, 30 wt %, 40 wt %, 50 wt %, and 60 wt %, respectively. The samples S1, S2, S3, S4, S5, S6, S7, and S8 were easily formed into a flat plate shape. Therefore, the resin member 10 can be easily formed into a desired shape as long as the resin member 10 has at least a content ratio of the powder 11 of 60 wt % or less. The samples S1, S2, S3, S4, S5, S6, S7, and S8 were put in a vacuum dryer in a state in which a moisture content ratio was 0.5% or less and then kept at 60° C. for 7 days to be in a dry state.

First, optical characteristics (the refractive index and the absorption coefficient) of the resin member 10 in the dry state with respect to the terahertz waves were measured. For each of the samples S1, S2, S3, S4, S5, S6, S7, and S8, the refractive index and the absorption coefficient were measured when the terahertz waves having different frequencies were transmitted. Measuring results are illustrated in FIGS. 5 and 6.

Figure 5:
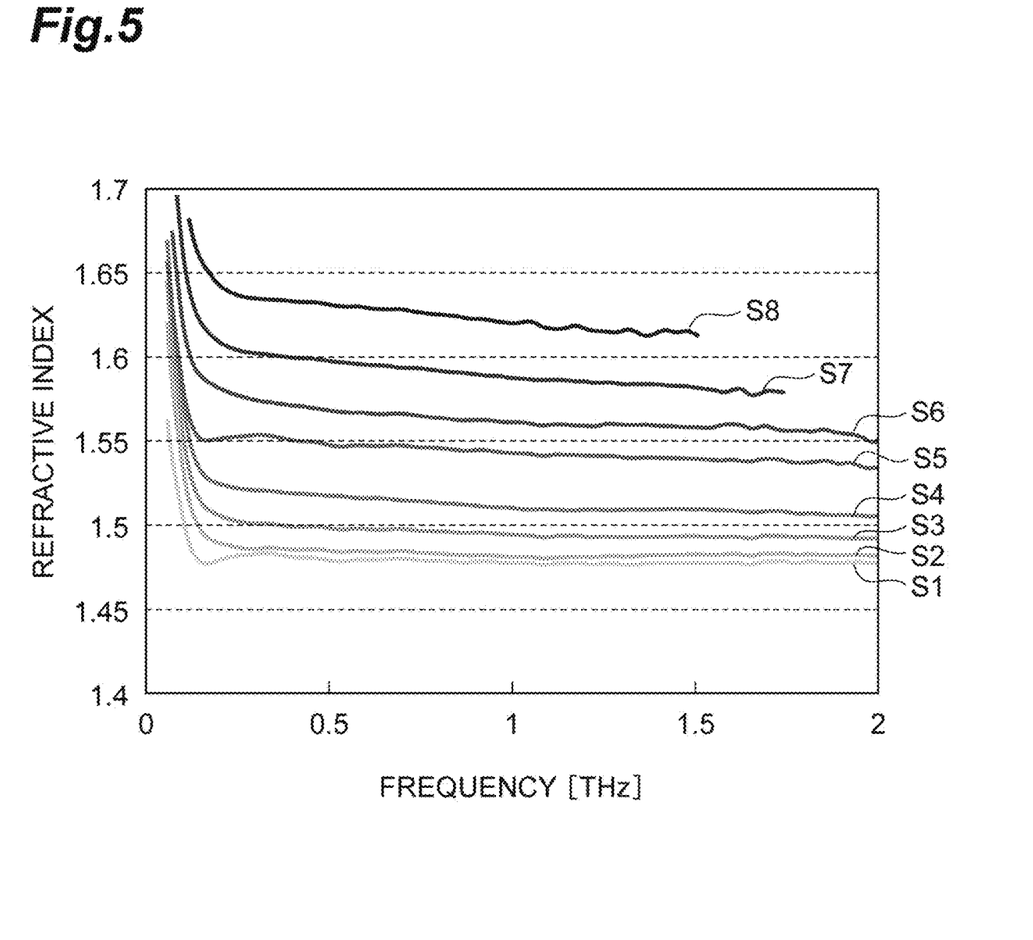
FIG. 5 is a view illustrating a frequency characteristic of a refractive index with respect to terahertz waves in a resin member contained in an optical component for terahertz waves.

FIG. 5 illustrates a frequency characteristic of the refractive index with respect to the terahertz waves in the resin member 10. In FIG. 5, a vertical axis indicates the refractive index, and a horizontal axis indicates the frequency of the terahertz waves incident on the sample. As illustrated in FIG. 5, in the terahertz waves of at least 0.2 THz to 1.5 THz, as the content ratio of the powder 11 becomes larger, the refractive index with respect to the terahertz waves increases.

Figure 6:
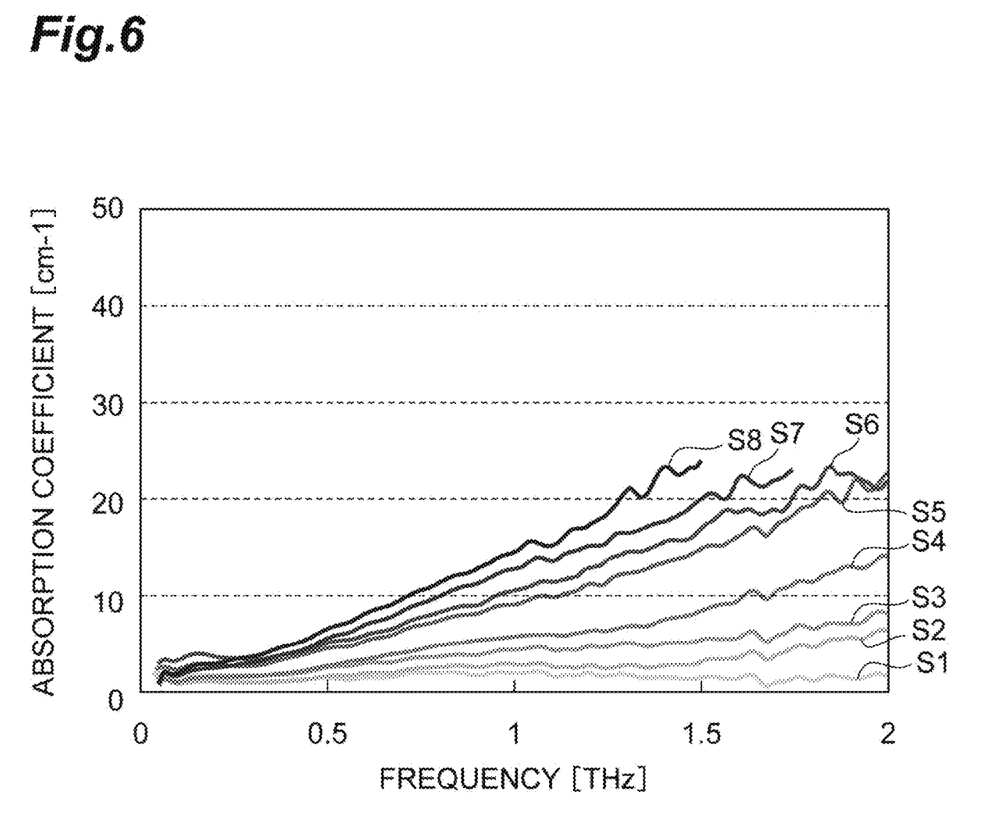
FIG. 6 is a view illustrating a frequency characteristic of an absorption coefficient with respect to the terahertz waves in the resin member.

FIG. 6 illustrates a frequency characteristic of the absorption coefficient with respect to the terahertz waves in the resin member 10. In FIG. 6, a vertical axis indicates the absorption coefficient with respect the terahertz waves, and a horizontal axis indicates the frequency of the terahertz waves incident on the sample. As illustrated in FIG. 6, in the terahertz waves of at least 0.2 THz to 1.5 THz, as the content ratio of the powder 11 becomes larger, the absorption coefficient with respect to the terahertz waves increases.

Figure 8:
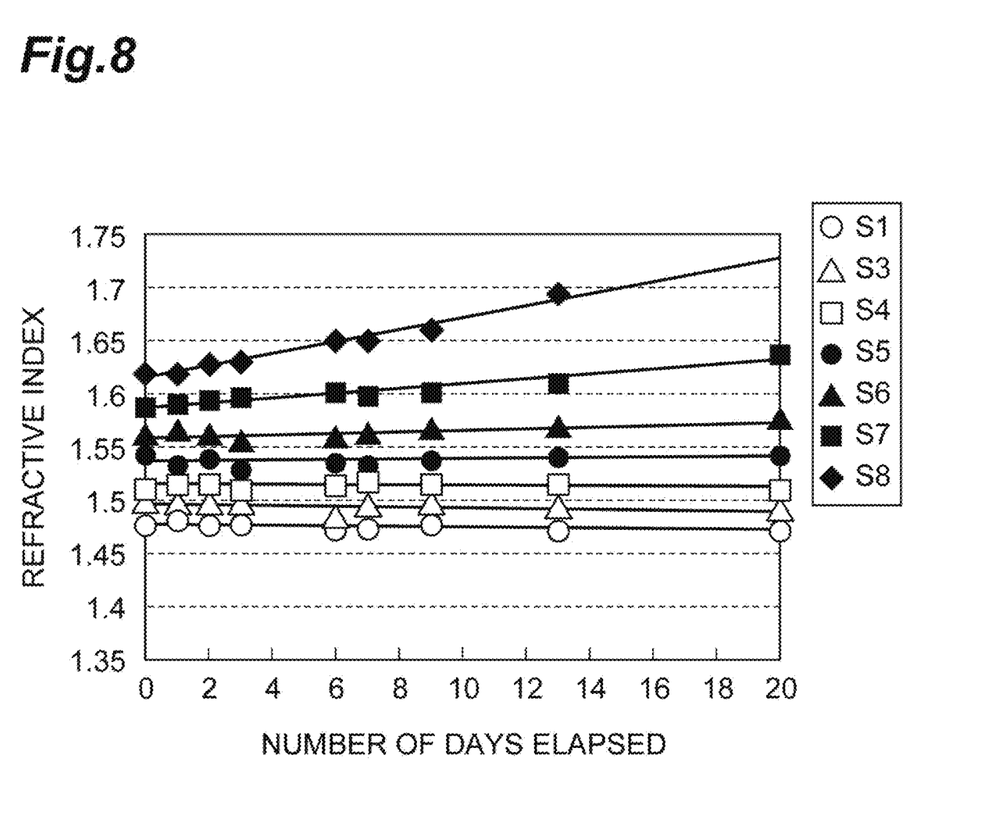
FIG. 8 is a view illustrating a temporal change of the refractive index with respect to the terahertz waves in the resin member placed in the high humidity environment.
Figure 9:
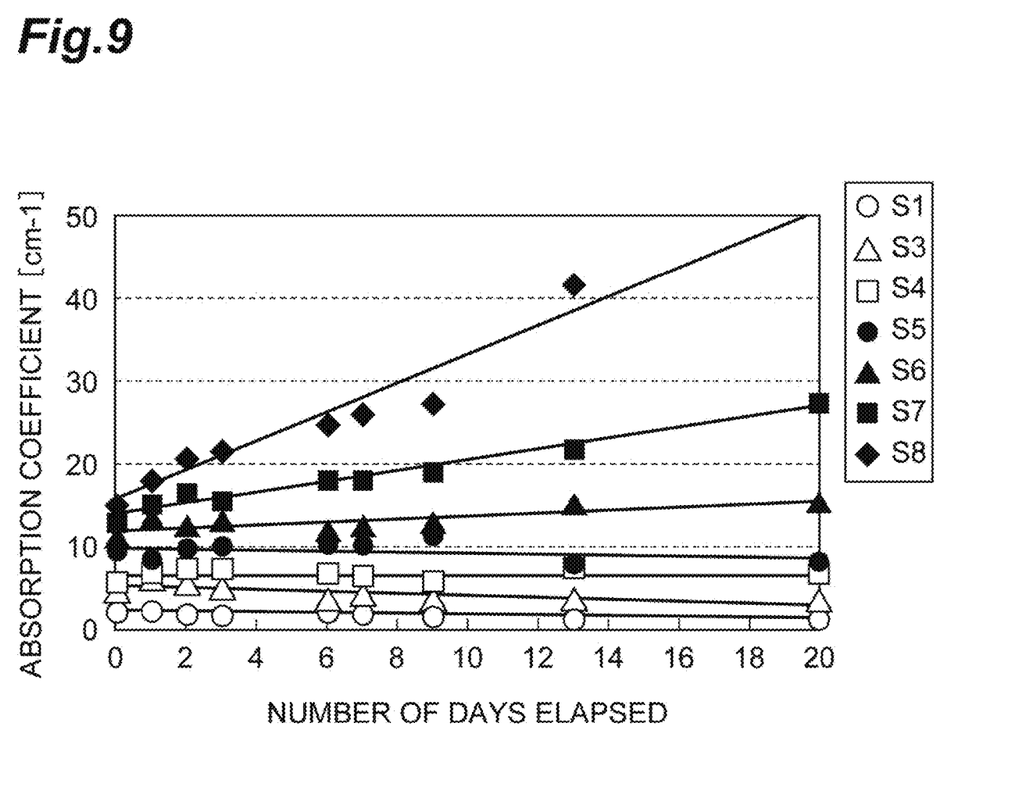
FIG. 9 is a view illustrating a temporal change of the absorption coefficient with respect to the terahertz waves in the resin member placed in the high humidity environment.

Then, a temporal change of the moisture content ratio of the resin member 10 in a high humidity environment, and a temporal change of the optical characteristics with respect to the terahertz waves were measured. The optical characteristics are, for example, the refractive index and the absorption coefficient. The samples S1, S2, S3, S4, S5, S6, S7, and S8 were immersed in purified water, and after a predetermined time elapsed, the samples S1, S2, S3, S4, S5, S6, S7, and S8 were taken out and weights and optical characteristics thereof were measured. After the weights and the optical characteristics were measured, the samples were immersed again in the purified water. The above-described operations were repeated for 20 days. The temporal change of the moisture content ratio in the samples S1, S2, S3, S4, S5, S6, S7, and S8 were measured by calculating the moisture content from an increasing amount of the measured weight. In the measurement of the optical characteristics, the refractive index and the absorption coefficient when terahertz waves of 1 THz were transmitted were measured for each of the samples S1, S2, S3, S4, S5, S6, S7, and S8. The measurement results are illustrated in FIG. 7, FIG. 8 and FIG. 9.

Figure 7:
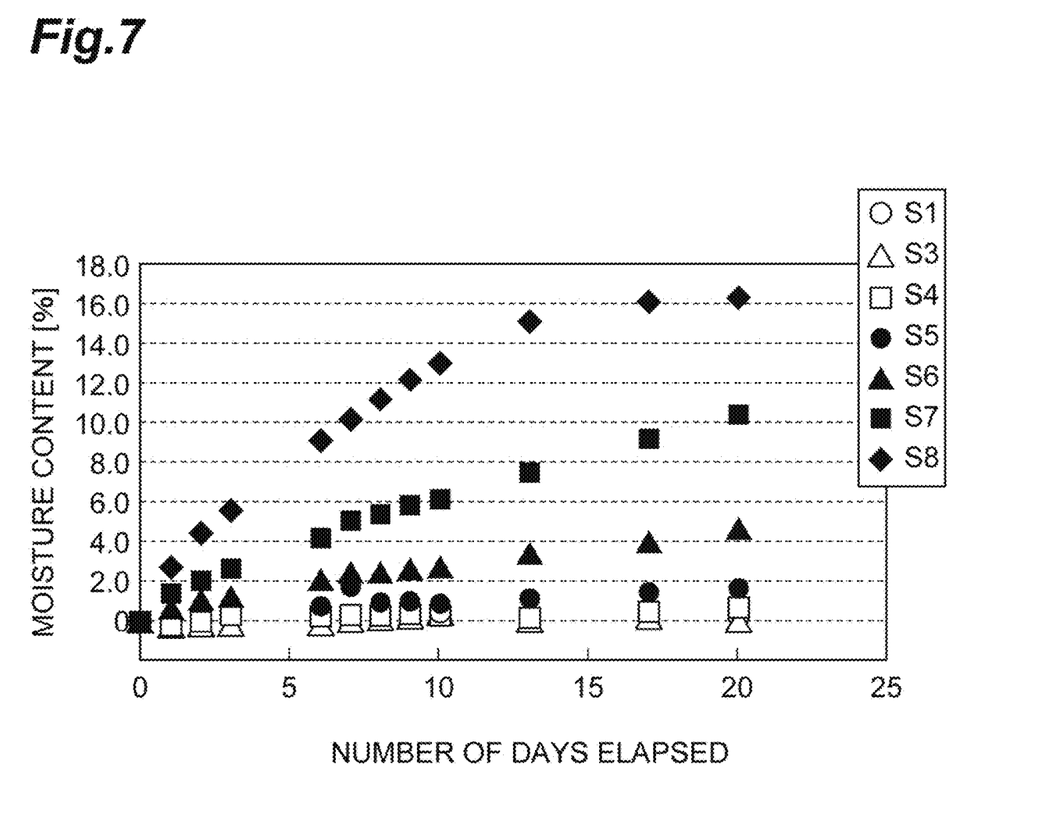
FIG. 7 is a view illustrating a temporal change of a moisture content ratio of the resin member placed in a high humidity environment.

FIG. 7 is a view illustrating a temporal change of the moisture content ratio of the resin member 10 placed in the high humidity environment. In this measurement, when the content ratio of the powder 11 is 20 wt % or less, the difference in the moisture content ratio is very small. Therefore, in FIG. 7, data of the sample S2 in which the content ratio of the powder 11 is 5 wt % is omitted, and a change in moisture content ratio when the content ratio of the powder 11 is changed in intervals of 10 wt % is illustrated. In FIG. 7, a vertical axis indicates the moisture content ratio of the sample, and a horizontal axis indicates the number of days that elapsed in a state in which the samples S1, S3, S4, S5, S6, S7, and S8 were immersed in the purified water. As illustrated in FIG. 7, as the content ratio of the powder 11 becomes larger, the change in water content ratio tends to be larger. In other words, as the content ratio of the powder 11 is lower, water tends not to penetrate from the outside.

Even when the samples S1, S3, S4, S5, and S6 having a content ratio of powder 11 of 40 wt % or less are immersed in the purified water for 20 days, the moisture content ratio of each of the sample S1, S3, S4, S5, and S6 does not change substantially. As the time for which the samples S7 and S8 having a content ratio of the powder 11 of 50 wt % to 60 wt % are immersed in the purified water is longer, the moisture content ratio of each of the samples S7 and S8 increases.

When the sample S8 including the powder 11 at 60 wt % was immersed in the purified water for 20 days, the moisture content ratio of the sample S8 was 16.4 wt %. On the other hand, when the sample S7 containing the powder 11 at 50 wt % was immersed in the purified water for 20 days, the moisture content ratio of the sample S7 was less than 11 wt %. When the sample S6 containing the powder 11 at 40 wt % was immersed in the purified water for 20 days, the moisture content ratio of the sample S6 was less than 5 wt %. When the samples S3, S4, and S5 including the powder 11 at 30 wt % or less are immersed in the purified water for 20 days, the moisture content ratio of each of the samples S3, S4, and S5 is less than 2.0 wt %, and there is almost no difference from the sample S1 including the powder 11 at 0 wt %.

FIG. 8 is a view illustrating the temporal change of the refractive index with respect to the terahertz waves in the resin member 10 placed in the high humidity environment. FIG. 9 is a view illustrating the temporal change of the absorption coefficient with respect to the terahertz waves in the resin member 10 placed in the high humidity environment. In this measurement, when the content ratio of the powder 11 is 10 wt % or less, a difference between the refractive index and the absorption coefficient with respect to the terahertz waves is very small. Therefore, in FIG. 8 and FIG. 9, the data of the sample S2 in which the content ratio of the powder 11 is 5 wt % is omitted, and the change in moisture content ratio when the content ratio of the powder 11 is changed in intervals of 10% is shown.

In FIG. 8, a vertical axis indicates the refractive index with respect to the terahertz waves of 1 THz, and a horizontal axis indicates the number of days that elapsed in the state in which the samples S1, S3, S4, S5, S6, S7, and S8 were immersed in the purified water. In FIG. 9, a vertical axis indicates the absorption coefficient with respect to the terahertz waves of 1 THz, and a horizontal axis indicates the number of days that elapsed in the state in which the samples S1, S3, S4, S5, S6, S7, and S8 were immersed in the purified water. In FIG. 8 and FIG. 9, lines obtained by a regression analysis from the measurement data are illustrated.

As illustrated in FIGS. 8 and 9, as the content ratio of the powder 11 becomes larger, the temporal change of the refractive index and the absorption coefficient (the optical characteristics) with respect to the terahertz waves of 1 THz tends to be larger. In other words, as the content ratio of the powder 11 becomes lower, optical characteristics with respect to the terahertz waves are less easily changed. When the temporal change of the moisture content ratio of the resin member 10 placed in the high humidity environment illustrated in FIG. 7 is taken into consideration, it is considered that the change in moisture content ratio of the resin member 10 is linked to the changes in refractive index and absorption coefficient with respect to the terahertz waves.

As illustrated in FIG. 8, when the samples S1, S3, S4, S5, and S6 having a content ratio of the powder 11 of 40 wt % or less are immersed in the purified water for 20 days, the refractive index with respect to the terahertz waves tends not to change in any of the samples S1, S3, S4, S5, and S6. As the time for which the samples S7 and S8 in which the content ratio of the powder 11 is 50 wt % to 60 wt % are immersed in the purified water is longer, the refractive index with respect to the terahertz waves increases in each of the samples S7 and S8. In the sample S7 in which the content ratio of powder 11 is 50 wt %, the change in refractive index with respect to the terahertz waves when each of the samples immersed in the purified water for 20 days is smaller than that of the sample S8 in which the content ratio of the powder 11 is 60 wt %.

As illustrated in FIG. 9, as the time for which the samples S7 and S8 including the powder 11 at 50 wt % to 60 wt % are immersed in the purified water is longer, the absorption coefficient with respect to the terahertz waves is increased in each of the samples S7 and S8. In the sample S7 in which the content ratio of powder 11 is 50 wt %, the change in absorption coefficient with respect to the terahertz waves when each of the samples is immersed in the purified water for 20 days is smaller than that of the sample S8 in which the content ratio of the powder 11 is 60 wt %. When the samples S1, S3, S4, S5, and S6 having a content ratio of the powder 11 of 40 wt % or less are immersed in the purified water for 20 days, the absorption coefficient with respect to the terahertz waves tends not to change in any of the samples S1, S3, S4, S5, and S6.

As described above, the optical components 1, 1A, 1B, and 1C have the resin member 10 including the powder 11 including cellulose. In order to form the resin member 10 into a desired shape as an optical component, it is considered necessary to suppress the content ratio of the powder 11 and to secure the content ratio of the synthetic resin 12 that contributes to the molding. In the optical components 1, 1A, 1B, and 1C, since the content ratio of the powder 11 in the resin member 10 is 60 wt % or less, the content ratio of the synthetic resin 12 can be secured. Therefore, an optical component having desired optical characteristics with respect to the terahertz wave L can be easily realized. For example, the molding of an optical component having a desired refractive index and absorption coefficient with respect to the terahertz wave L can be easily molded. For example, woody biomass is adopted as a raw material of the powder 11. The woody biomass is obtained, for example, from thinned wood. In this case, the optical components 1, 1A, 1B, 1C that can achieve environmental protection are obtained.

Despite the fact that strict accuracy is often required in the optical characteristics of the optical component, changes in optical characteristics of the optical component may tend not to recognize from an appearance of the optical component. Thus, temporal stability of the optical characteristics in the optical component is extremely important. According to the measurement results illustrated in FIGS. 7 to 9, the change in moisture content ratio of the resin member 10 may be also linked to the change in optical characteristics such as the refractive index and the absorption coefficient with respect to the terahertz waves. Therefore, an optical component of which the moisture content ratio tends not to change may be desired.

When the moisture content ratio of the optical component increases, expansion defamation of the optical component, a decrease in physical strength of the optical component, and the like may be of concern. When the optical component expands and is deformed or a surface of the optical component is scratched, there is a possibility that the optical characteristics resulting from a shape of the optical component may deteriorate. Therefore, also in this respect, an optical component in which the moisture content ratio tends not to change may be desired.

In the optical components 1, 1A, 1B, and 1C, the content ratio of the powder 11 in the resin member 10 may be 50 wt % or less. In this case, compared to a case in which the content ratio of at least the powder 11 is 60 wt %, water tends not to penetrate from the outside, as illustrated in FIG. 7, and the optical characteristics with respect to the terahertz waves also tends not to change as illustrated in FIG. 8 and FIG. 9. Therefore, the temporal stability of the optical characteristics with respect to the terahertz waves can be improved.

In the optical components 1, 1A, 1B, and 1C, the content ratio of the powder 11 in the resin member 10 may be 40 wt % or less. In this case, compared to a case in which the content ratio of at least the powder 11 is 60 wt % or 50 wt %, water tends not to penetrate from the outside, as illustrated in FIG. 7, and the optical characteristics with respect to the terahertz waves also tends not to change as illustrated in FIG. 8 and FIG. 9. Therefore, the temporal stability of the optical characteristics with respect to the terahertz waves can be improved.

In the optical components 1, 1A, 1B, and 1C, the content ratio of the powder 11 in the resin member 10 may be 5 wt % or more. In this case, as illustrated in FIGS. 5 and 6, the refractive index and the absorption coefficient with respect to the terahertz waves are improved as compared with a case in which the content ratio of at least the powder 11 is 0 wt %. That is, a configuration in which the content ratio of the powder in the resin member is 5 wt % or more secures the desired optical characteristics with respect to the terahertz waves.

In the optical components 1, 1A, 1B, and 1C, the total content ratio of the powder 11 and the synthetic resin 12 may be larger than 97 wt %. A configuration in which the total content ratio of the powder and the synthetic resin in the optical component is larger than 97 wt % secures the content ratio of the synthetic resin 12 contributing to the molding and secures the desired optical characteristics with respect to the terahertz waves.

In the optical component 1A, the content ratio of the powder 11 varies according to a position in the optical component 1A. The optical component for terahertz waves may be configured so that the content ratio of the powder 11 per unit volume varies according to position in the optical component and thus may be configured to have an arbitrary refractive index at an arbitrary position with respect to the terahertz waves having an arbitrary frequency. That is, a configuration in which the content ratio of the powder per unit volume varies according to position in the optical component realizes the optical component having different optical characteristics with respect to the terahertz waves at positions therein.

This configuration increases variations in a shape and a use of the optical component, as compared with a configuration in which the powder is homogeneously distributed throughout the optical component. The above-described property may be used not only for lenses for terahertz waves but also for other optical components for terahertz waves. For example, an optical fiber for terahertz waves may be formed by forming a core and a clad having different refractive indexes from each other.

In the optical component 1A, the content ratio of the powder 11 decreases toward the end 4 of the optical component 1A when seen in the direction facing the entrance surface 2 of the optical component 1A. A configuration in which the content ratio of the powder 11 decreases or increases toward the end 4 of the optical component 1A when seen in the direction improves variations in the shape and the use of the optical component, as compared with the configuration in which the powder 11 is homogeneously distributed throughout the optical component. For example, as in the optical component 1A, a lens for terahertz waves having a flat plate shape can be realized.

Although the embodiment and modifications of the present invention have been described above, the present invention is not necessarily limited to the above-described embodiment and modifications, and various modifications can be made without departing from the gist thereof.

The optical component 1 may have a concave entrance surface 2 or exit surface 3. In this case, the optical component 1 serves as a concave lens for terahertz waves. That is, the optical component 1 may have a negative refractive power with respect to the terahertz wave L according to the shape of the entrance surface 2 or the exit surface 3. Each of the entrance surface 2 and the exit surface 3 may be a spherical or aspheric surface. In this case, the optical component 1 constitutes a lens having an arbitrary refractive power with respect to the terahertz wave having an arbitrary frequency.

In the embodiment, although the median value of the particle size of the powder 11 of the sample is about 150 the particle size of the powder 11 included in the resin member 10 is not limited thereto. The particle size of the powder 11 can be set to any value according to the use.

The optical components 1, 1A, 1B, and 1C may include not only the resin member 10 but also other members.

The optical component 1 may be configured as follows. The entrance surface 2 and the exit surface 3 have a convex or concave shape, and the content ratio of the powder 11 per unit volume varies according to the position in the optical component 1.

The optical component 1 may be configured as follows. The entrance surface 2 and the exit surface 3 have a concave shape, and the optical component 1 serves as a diffusion plate in which the terahertz wave is scattered by the powder 11, as in the optical component 1B.

The optical component 1 may be configured as follows. The entrance surface 2 and the exit surface 3 have a convex or concave shape, and the optical component 1 serves as a light attenuation filter in which the terahertz wave is attenuated by absorption and scattering in the powder 11, as in the optical component 1C.

The optical component 1A may be configured as follows. The content ratio of powder 11 per unit volume varies according to position in optical component 1A, and the optical component 1A serves as a diffusion plate in which the terahertz wave is scattered by the powder 11, as in the optical component 1B.

The optical component 1A may be configured as follows. The content ratio of powder 11 per unit volume varies according to position in the optical component 1A, and the optical component 1A serves as the light attenuation filter in which the terahertz wave is attenuated by absorption and scattering in the powder 11, as in the optical component 1C.

The optical component 1A may be configured as follows. The content ratio of the powder 11 increases toward the end 4 of the optical component 1A when seen in the direction facing the entrance surface 2 of the optical component 1A. In this case, in the optical component 1A, the refractive index with respect to the terahertz wave L increases toward the end 4 of the optical component 1A when seen in the direction facing the entrance surface 2 of the optical component 1A. As a result, the optical component 1A serves as a concave lens for terahertz waves. That is, the optical component 1A may be configured so that the content ratio of the powder 11 per unit volume varies according to the position in the optical component 1A when viewed in the direction facing the entrance surface 2 of the optical component 1A and thus may have a negative refractive power with respect to the terahertz wave L.

What is claimed is:

1. An optical component for terahertz waves, comprising:
   a resin member that includes a powder containing cellulose,
   wherein a content ratio of the powder in the resin member is more than 0 wt % and 60 wt % or less.
2. The optical component according to claim 1,
   wherein the content ratio of the powder in the resin member is more than 0 wt % and 50 wt % or less.
3. The optical component according to claim 1,
   wherein the content ratio of the powder in the resin member is more than 0 wt % and 40 wt % or less.
4. The optical component according to claim 1,
   wherein the content ratio of the powder in the resin member is 5 wt % or more and 60 wt % or less.
5. The optical component according to claim 1,
   wherein the resin member further includes a synthetic resin, and a total content ratio of the powder and the synthetic resin in the optical component is larger than 97 wt %.
6. The optical component according to claim 1,
   wherein the content ratio of the powder per unit volume varies corresponding to position in the optical component.
7. The optical component according to claim 6,
   wherein the content ratio of the powder decreases or increases toward an end of the optical component when seen in a direction facing an entrance surface of the optical component.

* * * * *